United States Patent [19]

Rich et al.

[11] Patent Number: 5,177,331
[45] Date of Patent: Jan. 5, 1993

[54] IMPACT DETECTOR

[75] Inventors: David B. Rich, Indianapolis; Dan W. Chilcott, Greentown, both of Ind.

[73] Assignee: Delco Electronics Corporation, Kokomo, Ind.

[21] Appl. No.: 726,099

[22] Filed: Jul. 5, 1991

[51] Int. Cl.$^5$ .................. H01H 35/14; G01P 15/08
[52] U.S. Cl. .................. 200/61.45 R; 73/517 R; 200/181
[58] Field of Search ............ 200/61.45 R–61.53, 200/181; 73/1 D, 517 R

[56] References Cited

U.S. PATENT DOCUMENTS

| | | | |
|---|---|---|---|
| 3,097,272 | 7/1963 | Hautly | 200/61.49 |
| 4,345,474 | 8/1982 | Deval | 73/517 B |
| 4,483,194 | 11/1984 | Rudolf | 73/517 R |
| 4,543,457 | 9/1985 | Petersen et al. | 200/83 N |
| 4,566,328 | 1/1986 | Bernard et al. | 73/517 B |
| 4,581,506 | 4/1986 | Bai et al. | 200/61.45 R |
| 4,581,507 | 4/1986 | Bai et al. | 200/61.45 R |
| 4,673,777 | 6/1987 | Bai et al. | 200/61.45 R |
| 4,737,660 | 4/1988 | Allen et al. | 307/112 |
| 4,799,386 | 4/1989 | Bernard et al. | 73/517 B |
| 4,855,544 | 8/1989 | Glenn | 200/61.45 R |
| 4,932,260 | 6/1990 | Norton | 73/517 R |
| 5,001,933 | 3/1991 | Brand | 200/61.40 RX |

Primary Examiner—J. R. Scott
Attorney, Agent, or Firm—R. J. Wallace

[57] ABSTRACT

An impact detector includes a center chip of micromachined silicon, a top cap, and a back plate, with the center chip being sandwiched between the top cap and the back plate. The center chip is micromachined to provide a seismic mass, a perimeter ring, and a plurality of beams interconnecting the perimeter ring and the seismic mass. The center chip and back plate mount aligned switch contacts which close to each other when the seismic mass moves from its static or nondisplaced position to its operative or displaced position. An electrostatic attractive force is generated between the seismic mass and the back plate. This electrostatic attractive force is less than the tensile force applied to the seismic mass by the beams so that the seismic mass remains in its static or nondisplaced position unless the impact detector is subjected to an impulsive force of sufficient magnitude and duration such that the inertial reaction force of the seismic mass when coupled with the electrostatic attractive force is greater than the tensile force so that the seismic mass moves to the operative displaced position. In the operative displaced position, the electrostatic attractive force latches the switch contacts to each other until the electrostatic attractive force is reduced and the tensile force can then return the seismic mass to its static or nondisplaced position.

9 Claims, 1 Drawing Sheet

IMPACT DETECTOR

BACKGROUND OF THE INVENTION

This invention relates generally to impact detectors and more particularly to an impact detector for detecting impact of a moving object, such as a vehicle, with an obstacle.

Impact detectors for detecting impact of a moving object, such as a vehicle, with an obstacle, are known. Generally such detectors include a movable seismic mass which is located in a static or nondisplaced position by some type of motion resistant force, such as an elastic spring, a magnet, an inclined surface, or various combinations of such forces. The seismic mass closes switch contacts when the impact detector is subjected to an impulsive force of sufficient magnitude and duration which is applied to the seismic mass in a direction generally opposite the direction of movement of the seismic mass. The impulsive force must also be of sufficient magnitude and duration to overcome any damping force applied to the seismic mass during movement, such as by viscous dampers, electromagnetic dampers, or otherwise. The impact detector is mounted to the moving object, such as a vehicle, and the switch contacts are connected to circuitry which uses the impact detection information for various purposes, such as to actuate an inflatable occupant restraint system.

The impact detector of this invention is of this general type and includes: a movable seismic mass located in a static or nondisplaced position by a motion resistant force; viscous fluid damping; and, switch contacts which are closed when the seismic mass moves to its displaced position when the impact detector is subjected to an impulsive force of sufficient magnitude and duration and in the appropriate direction. Closure of the switch contacts can actuate a vehicle occupant protection device, such as an inflatable occupant restraint system.

In its preferred embodiment, the impact detector includes a center chip which is a micromachined silicon wafer having an integral seismic mass, a perimeter ring surrounding the seismic mass, and a plurality of integral beams interconnecting the seismic mass and the perimeter ring and applying a tensile force to the seismic mass locating the seismic mass in a static or nondisplaced position and resisting movement of the seismic mass toward a displaced position. A back plate is sandwiched to one side of the center chip and includes a number of switch contacts which are spaced from switch contacts on the seismic mass and are part of impact detection circuitry for actuating an occupant protection device, such as an inflatable occupant restraint system. A cover plate is sandwiched to the other side of the center chip. An electrostatic voltage is applied between the seismic mass and the back plate. Normally, the electrostatic attractive force is insufficient to overcome the motion resistant tensile force applied to the seismic mass by the beams so that the seismic mass is maintained in its static or nondisplaced position relative to the back plate. When an impulsive force of sufficient magnitude and duration and in the appropriate duration, generally opposite the direction of movement of the seismic mass toward displaced position, is applied to the impact detector, the electrostatic attractive force coupled with the inertial reaction of the seismic mass overcomes the tensile force and moves the seismic mass to the displaced or operative position wherein switch contacts on the seismic mass close to the switch contacts on the back plate and actuate the impact detection circuitry. Once the switch contacts close, the electrostatic attractive force maintains the switch contacts latched to each other. The inertial reaction of the seismic mass and the electrostatic attractive force must be sufficient to overcome the tensile force and the viscous damping force resulting from displacement of the air or other viscous fluid between the seismic mass and the back plate as the seismic mass moves to the displaced position.

The switch contacts remain latched to each other until such time as the electrostatic voltage is reduced and the tensile force is sufficient to overcome the reduced electrostatic attractive force and return the seismic mass to its static or nondisplaced position. This obviates the need for a timing circuit as part of the circuitry for the occupant protection device. The electrostatic voltage can also be increased when the seismic mass is in its nondisplayed position to increase the electrostatic attractive force to a level where it overcomes the tensile force and moves the seismic mass to the displaced position to close the switch contacts without any impulsive force being applied to the impact detector. This provides the impact detector with an in situ check capability permitting checking of the impact detector and the circuitry when desired or at predetermined intervals.

A primary feature of the impact detector of this invention is that it includes a seismic mass located in a static or nondisplaced position by tensile force applied to the seismic mass and balancing an electrostatic attractive force biasing the seismic mass to a displaced position. Another feature is that the electrostatic attractive force results from and electrostatic voltage applied between the seismic mass and a switch contact support spaced therefrom, with the space between the seismic mass and switch contact support containing a viscous damping medium. A further feature is that the seismic mass carries first switch contacts which are closed and latched to second switch contacts on the switch contact support when the impact detector is subjected to an impulsive force of sufficient magnitude and duration, with the resultant inertial reaction of the seismic mass coupled to the electrostatic attractive force being sufficient to overcome the tensile force and any damping forces resulting from displacement by the seismic mass of the viscous damping medium separating the seismic mass and the switch contact support. Yet another feature is that the switch contacts remain latched until the electrostatic voltage is reduced to a level where the electrostatic attractive force is overcome by the tensile force. Yet a further feature is that the electrostatic voltage can be increased to increase the electrostatic attractive force to a level where it overcomes the tensile force and moves the seismic mass from its static or nondisplaced position to its displaced position in order to provide an in situ check of the operability of the impact detector and the circuitry connecting the impact detector with an occupant protection device. Still another feature is that the seismic mass is part of a micromachined silicon wafer and the tensile force locating the seismic mass in a static or nondisplaced position is provided by a plurality of beams supporting the seismic mass within a perimeter ring of the silicon wafer.

BRIEF DESCRIPTION OF THE DRAWING

These and other features of this invention will be apparent from the following specification and drawings wherein.

DETAILED DESCRIPTION

Figure 1:
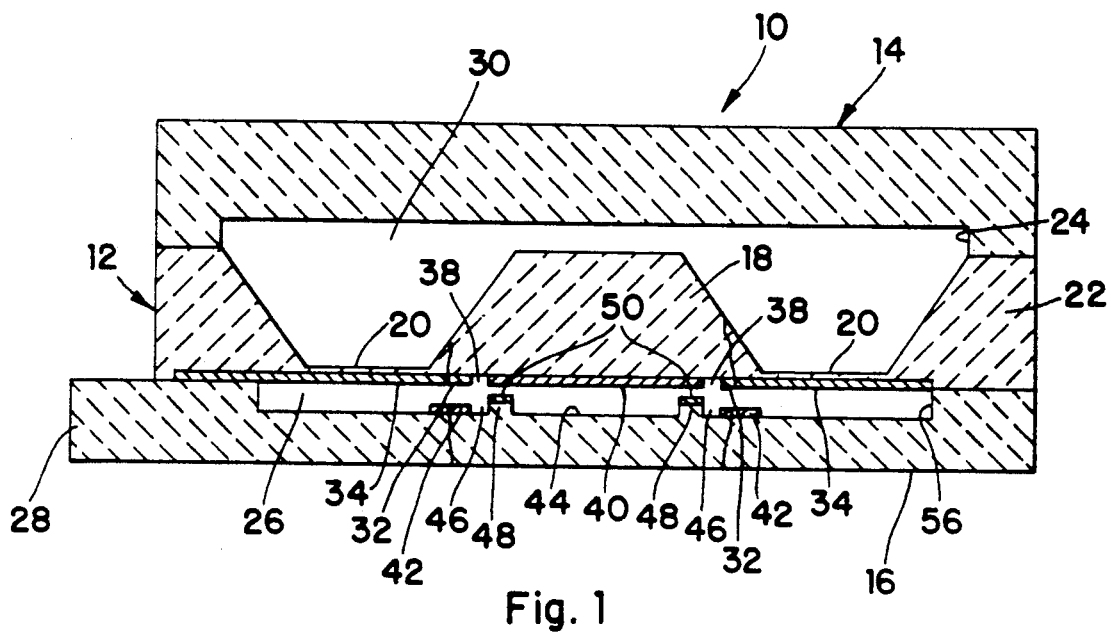
FIG. 1 is a sectional view of an impact detector according to this invention.

Referring now to the drawings, an impact detector 10 according to this invention includes a center chip 12, a top cap 14, and a back plate 16. The center chip 12 is a silicon wafer which is micromachined to provide an elongated seismic mass 18 of truncated pyramidal shape, four parallel spaced planar beams 20, and a perimeter ring 22 of generally square shape, all formed from a solid piece of silicon by known chemical etching process. The truncated shape of the seismic mass results from the particular chemical etching process used, preferential etching along certain crystal planes. Seismic masses of other shapes, such as rectangular, may also be provided with different etching processes. The beams 20 are planar and are shown parallel to each other, although the beams may be non-parallel located with respect to each other if so desired. The perimeter ring 22 provides a stable support for the seismic mass 18 and the beams 20.

The top cap 14 is likewise formed of a single piece of silicon and includes a depending flange 24 which seats on and is secured to the upper surface of the perimeter ring 22.

The back plate 16 is also formed of a single piece of silicon and includes a recess 26 which opens upwardly toward the center chip 12. It will be noted that the back plate is flush with the center chip 12 along three sides thereof but has one side 28 which extends outwardly of the center chip. The back plate is suitably secured to the lower surface of the perimeter ring 22 and cooperates therewith and the top cap 14 to provide an enclosed air filled space 30 within which the seismic mass 18 moves.

A conducting layer 32 is applied to the lower surface of the seismic mass and includes integral extensions 34 applied to the lower surfaces of each of the beams 20. One extension 34 extends partially on to the perimeter ring 22 and terminates in a pad or contact 36 on the lower surface of the perimeter ring 22. The conducting layer 32 is cut out at 38 at each end thereof and a transverse switch contact 40 is located in the cut out 38 and insulated from the conducting layer 32 by the silicon material of the center chip 12.

Figure 2:
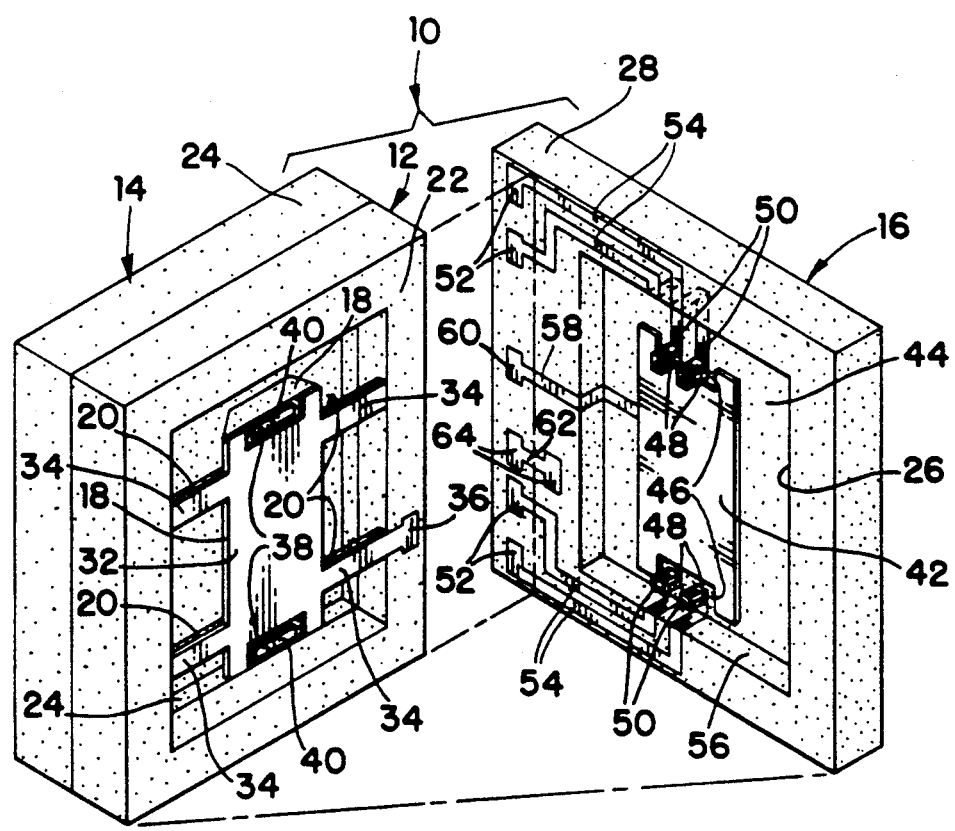
FIG. 2 is a partial perspective view of an impact detector according to this invention.

A conducting layer 42 is applied to the base wall 44 of the recess 26 of the back plate 16. The layer 42 is generally of the same size as the layer 32 and is aligned therewith. The layer 42 includes cut outs 46 at each end thereof generally aligned with the cutouts 38 of the center chip 12. Located within each cut out 46 is a pair of upstanding posts 48 of the base wall 44. The upper surface of each post is covered with a conducting layer or contact 50 which is connected to a respective pad or contact 52 on the side 28 of the back plate by a conducting layer or strip 54 which extends from a respective contact 50 along an outer side of the respective post 48, along the base wall 44 of the recess 26 to a side wall 56 thereof, upwardly of the side wall to the upper surface of the back plate, and then along such upper surface to a respective pad or contact 52 on the outwardly extending side 28 of the back plate, as can be seen in FIG. 2. A conducting layer or strip 58 extends from the conducting layer 42 along the base wall 44, side wall 56 and upper surface of the back plate to a pad or contact 60 on the outwardly extending side 28 of the back plate. A further conducting layer or strip 62 extends between pads or contact areas 64 on the outwardly extending side 28 of the back plate.

When the top cap 14 is assembled to the upper side of the center chip 12 and the back plate 16 is assembled to the lower side thereof to form the impact detector, the pads or contacts 52, 60 and 64 are exposed on the outwardly extending side 28 of the back plate. Each contact 40 is located in transverse spaced relationship to a respective pair of contacts 50. The strip 62 and the pads or contacts 64 electrically engage the pad or contact 36 of the center chip 12. The pairs of pads or contacts 52 are connected to an actuation circuit of an occupant protection device, such as an inflatable occupant restraint system.

The pads or contacts 60 and 64 are connected across a source of power to apply a voltage between the conducting layers 32 and 42 and thus apply an electrostatic force to the seismic mass 18 biasing the seismic mass toward the back plate 16. This electrostatic force is less than the tensile force of the beams 20 so that the seismic mass remains in its static or nondisplaced position relative to the back plate, with the contacts 40 and 50 spaced from each other. When an impulsive force of sufficient magnitude and duration and in the appropriated direction, upwardly of the impact detector, is applied to the impact detector, the inertial reaction of the seismic mass and the electrostatic force become greater than the tensile force of the beams 20 and the seismic mass thereupon moves downwardly or toward the back plate to its operative or displaced position wherein the switch contacts 40 and 50 close to each other and actuate the actuation circuitry of the occupant protection device. The viscous damping resulting from the seismic mass displacing the air layer between the seismic mass and the wall 44 of the back plate 16 increases the total energy required to move the seismic mass from its static or nondisplaced position to its operative displaced position.

Once the switch contacts 40 and 50 close to each other, they remain latched to each other under the electrostatic force between the conducting layers 32 and 42. Thus, the actuation circuitry for the occupant protection device need not include any timing circuit.

After a predetermined period of time or the occurrence of some event, the voltage between the layers 32 and 42 is reduced to reduce the electrostatic force therebetween to less than the tensile force of the beams 20. Thereupon, the tensile force returns the seismic mass to its static or nondisplaced position. Likewise, the electrostatic force between the layers 32 and 42 can be increased in the non-displaced position of the seismic mass 18 to overcome the tensile force of the beams 20 and move the mass to its displaced position and provide for in situ checking of the operability of the impact detector and the actuation circuitry for the occupant protection device.

Although the impact detector has been shown and described as including four spaced parallel beams 20, it should be understood that the number of beams may be more or less than four and that such beams need not be located in parallel relationship, provided, that the tensile force resulting from such beams is sufficient to withstand the electrostatic force between the layers 32 and 42 and locate the seismic mass 18 in its static or nondisplaced position.

Thus, this invention provides an improved impact detector which includes a seismic mass located in a nondisplaced position by tensile forces which balance an electrostatic force biasing the seismic mass to a displaced position, with the mass being movable to the displaced position when an impulsive force of sufficient amount is added to the electrostatic force.

The embodiments of the invention in which an exclusive property or privilege is claimed are defined as follows:

1. An impact detector for detecting impact of a moving object with an obstacle comprising, a seismic mass, means applying a tensile force to the seismic mass to locate the seismic mass in a static or nondisplaced position and resist movement of the seismic mass to an operative displaced position, first contact means carried by the seismic mass for movement therewith, contact support means located in spaced relationship to the first contact means, second contact means on the contact support means for closure to the first contact means upon displacement of the seismic mass to the operative displaced position, and means applying an electrostatic force between the seismic mass and the contact support means biasing the seismic mass toward the displaced position, the tensile force applied to the seismic mass being sufficient to resist movement of the seismic mass to the displaced position by the electrostatic force, the application of an impulsive force to the seismic mass coupled with the electrostatic force overcoming the resistance of the tensile force and moving the seismic mass to the displaced position wherein the electrostatic force latches the first contact means to the second contact means, and means for reducing the electrostatic force between the seismic mass and contact support means in the displaced position of the seismic mass to allow the tensile force to unlatch the first and second contact means and return the seismic mass to the static or nondisplaced position.

2. An impact detector for detecting impact of a moving object with an obstacle comprising, a support, a seismic mass, a plurality of beams interconnecting the support and the seismic mass applying a tensile force to the seismic mass to locate the seismic mass in a static or nondisplaced position and resist movement of the seismic mass to an operative displaced position, first contact means carried by the seismic mass for movement therewith, contact support means located in spaced relationship to the first contact means, second contact means on the contact support means for closure to the first contact means upon displacement of the seismic mass to the operative displaced position, and means applying an electrostatic force between the seismic mass and the contact support means biasing the seismic mass toward the displaced position, the tensile force applied to the seismic mass being sufficient to resist movement of the seismic mass to the displaced position by the electrostatic force, the application of an impulsive force to the seismic mass coupled with the electrostatic force overcoming the resistance of the tensile force and moving the seismic mass to the displaced position wherein the electrostatic force latches the first contact means to the second contact means, and means for reducing the electrostatic force between the seismic mass and contact support means in the displaced position of the seismic mass to allow the tensile force to unlatch the first and second contact means and return the seismic mass to the static or nondisplaced position.

3. An impact detector for detecting impact of a moving object with an obstacle comprising, a silicon wafer micromachined to provide a seismic mass, a perimiter ring surrounding the seismic mass and means interconnecting the perimeter ring and seismic mass and applying a tensile force to the seismic mass to locate the seismic mass in a static or nondisplaced position and resist movement of the seismic mass to an operative displaced position, first contact means carried by the seismic mass for movement therewith, contact support means located in spaced relationship to the first contact means, second contact means on the contact support means for closure to the first contact means upon displacement of the seismic mass to the operative displaced position, and means applying an electrostatic force between the seismic mass and the contact support means biasing the seismic mass toward the displaced position, the tensile force applied to the seismic mass being sufficient to resist movement of the seismic mass to the displaced position by the electrostatic force, the application of an impulsive force to the seismic mass coupled with the electrostatic force overcoming the resistance of the tensile force and moving the seismic mass to the displaced position wherein the electrostatic force latches the first contact means to the second contact means, and means for reducing the electrostatic force between the seismic mass and contact support means in the displaced position of the seismic mass to allow the tensile force to unlatch the first and second contact means and return the seismic mass to the static or nondisplaced position.

4. An impact detector for detecting impact of a moving object with an obstacle comprising, a silicon wafer micromachined to provide a seismic mass, a perimeter ring surrounding the seismic mass and a plurality of beams interconnecting the perimeter ring and seismic mass and applying a tensile force to the seismic mass to locate the seismic mass in a static or nondisplaced position and resist movement of the seismic mass to an operative displaced position, first contact means carried by the seismic mass for movement therewith, contact support means located in spaced relationship to the first contact means, second contact means on the contact support means for closure to the first contact means upon displacement of the seismic mass to the operative displaced position, and means applying an electrostatic force between the seismic mass and the contact support means biasing the seismic mass toward the displaced position, the tensile force applied to the seismic mass being sufficient to resist movement of the seismic mass to the displaced position by the electrostatic force, the application of an impulsive force to the seismic mass coupled with the electrostatic force overcoming the resistance of the tensile force and moving the seismic mass to the displaced position wherein the electrostatic force latches the first contact means to the second contact means, and means for reducing the electrostatic force between the seismic mass and contact support means in the displaced position of the seismic mass to allow the tensile force to unlatch the first and second contact means and return the seismic mass to the static or nondisplaced position.

5. The combination recited in claim 4 wherein the beams are located in parallel spaced relationship to each other.

6. The combination recited in claim 4 wherein the beams are located in nonparallel relationship to each other.

7. The combination recited in claim 1 wherein the seismic mass is of truncated pyramidal shape.

8. The combination recited in claim 4 wherein the seismic mass is of truncated pyramidal shape and the beams are planar.

9. The combination recited in claim 1 wherein the seismic mass and contact support means are each provided with a contact layer and a voltage is applied between such layers to generate the electrostatic force between the seismic mass and the contact support means.

* * * * *